Aug. 23, 1949.  R. A. BELL  2,479,714
TIRE FOR AMPHIBIOUS AIRPLANES AND VEHICLES
Filed April 18, 1945
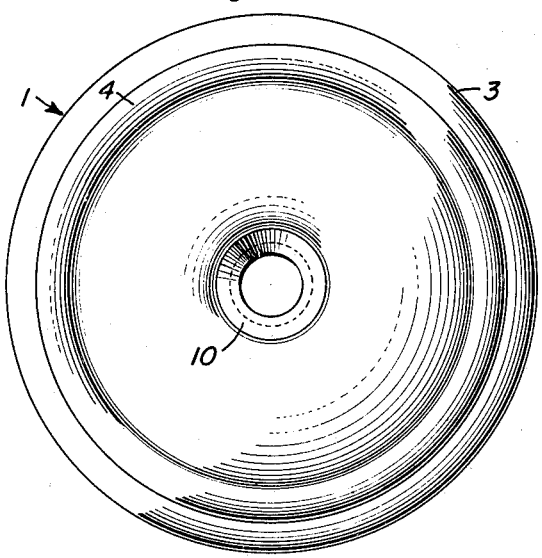
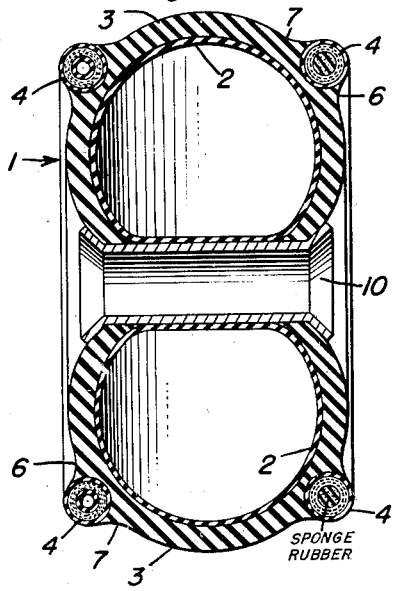
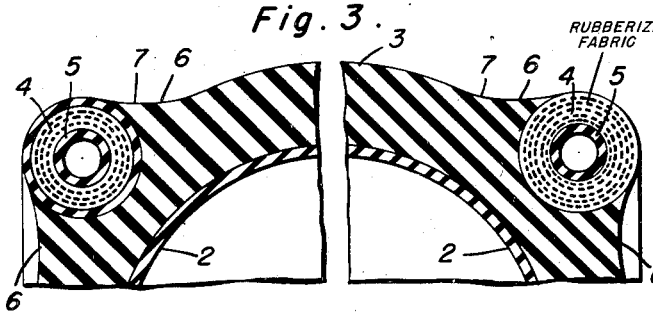
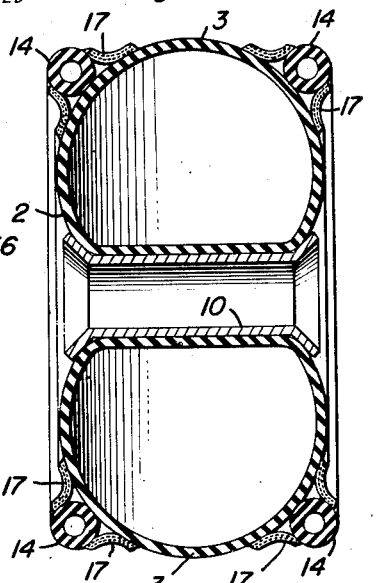
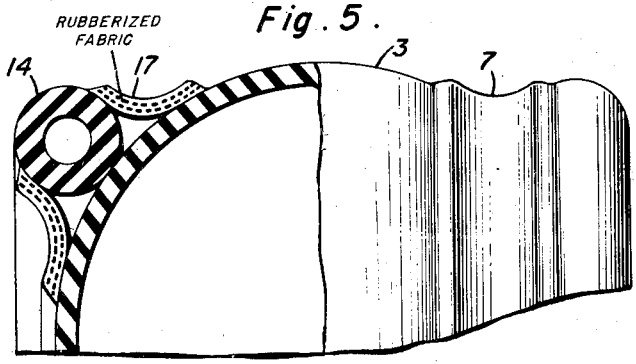
Inventor
Rowland A. Bell Patented Aug. 23, 1949

2,479,714

UNITED STATES PATENT OFFICE 2,479,714

TIRE FOR AMPHIBIOUS AIRPLANES AND VEHICLES

Rowland A. Bell, Miami, Fla.

Application April 18, 1945, Serial No. 589,001

1 Claim. (Cl. 152—352)

This invention relates to tires and in particular to tires for airplanes, although the construction is usable for tire designs made for land or for amphibious vehicles.

The principal object of the invention is to provide airplane tires which may be used on planes which operate both from land and water and which give favorable water characteristics to tires, which will permit landing on ordinary air fields as well as on undeveloped air fields or landing grounds with a soft or marshy soil, and which increase maneuverability of the plane on such soil.

According to the invention the tire is provided with spray tubes arranged on both sides and protruding from the normal round or torus profile. These spray tubes increase the buoyancy of the tires and provide a streamlined profile with a relatively large base for pressing downwardly, characteristics which are favorable for the taking off maneuvers from the water.

On land the spray tubes contribute to spread the surface on which the plane rests, so that landing in general and maneuvering on the soft or marshy ground of undeveloped air fields is facilitated to a marked extent.

Further objects and advantages of the invention will be apparent from the following detailed specification which describes and illustrates two modifications of the invention. It is, however, to be understood that these modifications are described by way of example only.

The accompanying drawings illustrate these modifications.

In the drawings:

Figure 1 is an elevational side view of one modification of a tire of an airplane.

Figure 2 is a sectional view of the same modification, the section being taken along any plane passing through the axis of the wheel.

Figure 3 is partly sectional front view of a portion of the tire on an enlarged scale.

Figure 4 is a sectional view through a second modification, the section being taken along any plane passing through the axis of the wheel.

Figure 5 is a partly sectional front view of the same modification on an enlarged scale.

In the modification of an amphibious airplane tire illustrated in Figures 1 to 3, a tire 1 with an inner tube 2 is shown seated on the customary hub member 10. The carcass of the tire which is made of the usual rubberized cord fabric carries the tread 3 made of tread rubber. Into this rubber the spray tubes 4 are embedded at the time when the tire is manufactured, and said carcass and tread are molded accordingly and are united with the spray tubes.

The spray tubes 4 may be made in various different manners. They may be made of heavy and tough rubberized fabric alone (Figure 3 right side) or of such fabric covered with tough rubber as shown in Figure 3 left side. They may also be made either as single tube tires (Figure 5) or they may be provided with an inner tube 5 as illustrated in Figure 3. While the former case is described later, the spray tubes provided with inner tubes 5 are inflatable.

As is clearly seen from Figures 2 and 3 the spray tubes 4 are embedded approximately to the extent of one-half of their diameter, which permits about one-half of the spray tube to protrude outwardly. The depth of the embedded portion may be increased by providing the tread at this place with an outwardly extending ledge portion 6 in which the spray tube is seated.

It will be clear that the spray tubes 4 are able to fulfill a multiple function. When in the water they will not increase to any appreciable extent the resistance or friction. On the other hand, they will increase buoyancy and they form together with the tread a pressure surface which is extended laterally to a great extent. The pressure surface on which the wheel rests is as large, if not larger, that that of a square of the same diameter, especially when the pressure flattens the tire somewhat.

This enlargement of the ground pressure surface of the tire is of special importance for the landing or take off maneuvers on land, and in particular on airfields with no prepared ground or with imperfectly prepared ground. The increase in surface on which the airplane rests will permit negotiating of soft or marshy soil, which would present heavy obstacles to wheels with other tires. Moreover, in spite of the flattening of the tire and of its resting on the spray tubes circumferential grooves will remain (at the places marked with the reference letter 7) which permit to eject loose material and which, in soft and slippery grounds, will cause the formation of guiding wedges on the ground, keeping the wheel on its track and acting as an anti-skid means.

Instead of carrying an inner tube as indicated in Figure 3 the spray tube 14 may be of such thickness relatively to the empty space surrounded that it is able to support itself in its original shape without any air pressure (Figures 4 and 5). It is moreover also possible to fill the inner space with sponge rubber as indicated in the right half of Figure 2 so that the elasticity of the sponge assists in the recovering of the original shape after deformation, while permitting such deformation under load pressure.

In the modification shown in Figures 4 and 5 the tire 1 is shown as being of a conventional single tube design with a carcass provided with a tread 3 mounted on the usual hub member 10. The spray tubes 14 in this case are separate tubes of the single tube type which are fastened to the carcass or tread by means of circumferential strips 17 of rubberized fabric fixed on tire and spray tube by vulcanization or any other convenient process.

The spray tubes 14 whether provided with inner tubes, or single tubes may be inflated by means of the conventional valve (not shown). This method permits to use spray tubes of larger diameter spreading the load carrying surface, deepening the guiding grooves 7 and making the edges of said grooves more effective.

It will be obvious to experts skilled in the art that certain modifications will have to be made to cope with the problems raised by the use of larger planes or heavier loads than those here considered, or in the event that tires of this type are to be used on amphibious land vehicles.

I claim:

A tire for amphibious use, for airplanes and other vehicles, comprising a carcass and a tread fixed thereon, circumferentially arranged lateral spray tubes on both sides of said tread, and means fixing said spray tubes on the tires including circumferential strips of rubberized fabric.

ROWLAND A. BELL.

REFERENCES CITED

The following references are of record in the file of this patent:

UNITED STATES PATENTS

| Number | Name | Date |
| --- | --- | --- |
| 1,131,772 | Chinnock | Mar. 16, 1915 |
| 1,272,664 | Hummel | July 16, 1918 |
| 1,581,590 | Moore | Apr. 20, 1926 |

FOREIGN PATENTS

| Number | Country | Date |
| --- | --- | --- |
| 20,190 | Great Britain | 1891 |
| 319,007 | Great Britain | 1928 |
| 440,052 | France | 1912 |